(12) United States Patent
Paulauskas et al.

(10) Patent No.: US 7,786,253 B2
(45) Date of Patent: *Aug. 31, 2010

(54) APPARATUS AND METHOD FOR OXIDATION AND STABILIZATION OF POLYMERIC MATERIALS

(75) Inventors: Felix L. Paulauskas, Knoxville, TN (US); Terry L. White, Knoxville, TN (US); Daniel M. Sherman, Knoxville, TN (US)

(73) Assignees: Ut-Battelle, LLC, Oak Ridge, TN (US); Sentech, Inc., Oak Ridge, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/466,092

(22) Filed: May 14, 2009

(65) Prior Publication Data

US 2009/0263295 A1 Oct. 22, 2009

Related U.S. Application Data

(63) Continuation of application No. 11/344,573, filed on Jan. 31, 2006, now Pat. No. 7,534,854.

(60) Provisional application No. 60/666,301, filed on Mar. 29, 2005.

(51) Int. Cl.
*C08G 64/00* (2006.01)
*C08G 63/02* (2006.01)

(52) U.S. Cl. .................. 528/480; 118/715; 118/723 E; 205/687; 264/176.1; 264/219; 422/102; 422/104; 424/111; 424/9; 424/32; 424/422; 424/423; 424/491; 428/212; 428/447; 528/171; 528/271; 528/272; 536/24.3; 536/25.3

(58) Field of Classification Search ................. 118/715; 118/723 E; 205/687; 264/176.1, 219; 422/102, 422/104; 424/1.11, 9.32, 422, 423, 491; 428/212, 447; 528/171, 271, 272, 480; 536/24.3, 536/25.3

See application file for complete search history.

(56) References Cited

U.S. PATENT DOCUMENTS

| 2,789,915 | A | | 4/1957 | Bishop |
|---|---|---|---|---|
| 2,913,802 | A | | 11/1959 | Barnett |
| 3,027,222 | A | | 3/1962 | Wilkinson |
| 3,125,404 | A | | 3/1964 | Crawley |
| 3,285,696 | A | | 11/1966 | Tsunoda |
| 3,699,210 | A | | 10/1972 | Binning et al. |
| 3,708,326 | A | | 1/1973 | Chenevey et al. |
| 3,720,759 | A | | 3/1973 | Overhoff |
| 3,814,577 | A | | 6/1974 | Menikheim |
| 3,817,700 | A | | 6/1974 | Menikheim |
| 3,820,951 | A | | 6/1974 | Di Edwardo |
| 3,914,394 | A | | 10/1975 | Fukushima |
| 3,933,986 | A | | 1/1976 | Matsumura et al. |
| 4,197,282 | A | | 4/1980 | Bailly-Lacresse et al. |
| 4,816,098 | A | * | 3/1989 | Davis et al. ............ 156/345.31 |
| 4,818,326 | A | * | 4/1989 | Liu et al. ................ 156/345.36 |
| 4,822,450 | A | * | 4/1989 | Davis et al. .................. 438/709 |
| 5,330,935 | A | | 7/1994 | Dobuzinsky et al. |
| 5,412,246 | A | | 5/1995 | Dobuzinsky et al. |
| 5,804,108 | A | | 9/1998 | Wilkinson |
| 6,054,214 | A | | 4/2000 | Wilkinson |
| 6,083,355 | A | | 7/2000 | Spence |
| 6,372,192 | B1 | | 4/2002 | Paulauskas et al. |
| 6,514,449 | B1 | | 2/2003 | Paulauskas et al. |
| 6,733,737 | B1 | | 5/2004 | Tan et al. |
| 7,294,673 | B2 | * | 11/2007 | Kanazawa .................... 525/64 |
| 7,438,882 | B2 | * | 10/2008 | Goodwin et al. ............ 423/337 |
| 7,534,854 | B1 | * | 5/2009 | Paulauskas et al. ......... 528/480 |
| 2003/0051993 | A1 | | 3/2003 | Ricatto et al. |

FOREIGN PATENT DOCUMENTS

GB 1251822 11/1971

OTHER PUBLICATIONS

Delmonte, Technology of carbon and graphite fiber composites, 1981, pp. 55-61 and 190-191, Van Nostrand Reinhold, New York.
Cohn and Das, A cost assessment of PAN carbon fiber production technologies; conventionall and microwave cases, 1999, Oak Ridge National Laboratory, Oak Ridge, TN.
Peebles, Carbon fibers: formation, structure, and properties, 1994, pp. 7-25 and 128-135, CRC Press, Boca Raton.
Donnet et al., Carbon fibers, Third edition, 1998, pp. 180-189, Marcel Dekker, New York.
Johnson, Carbon fibers, 2000, in Structure formation in polymeric fibers, D.R. Salem editor, pp. 329-333, Hanser Publishers, Munich.
Liston et al., Plasma surface modification of polymers for improved adhesion: a critical review, 1993, J. Adhesion Sci Tech. vol. 7, No. 1, pp. 1091-1127.
Mittal and Pizzi, Adhesion promotion techniques, 1999, pp. 67-76 and 139-173, Marcel Dekker, New York.
Rahel et al., The transition from a filamentary dielectric barrier discharge to diffuse barrier discharge in an air at atmospheric pressure, 2005, J. Phys. D: App. Phys. 38, 1-8.

(Continued)

*Primary Examiner*—Terressa M Boykin
(74) *Attorney, Agent, or Firm*—Scully, Scott, Murphy & Presser, P.C.

(57) ABSTRACT

An apparatus for treating polymeric materials comprises a treatment chamber adapted to maintain a selected atmosphere; a means for supporting the polymeric material within the chamber; and, a source of plasma-derived gas containing at least one reactive oxidative species whereby the polymer is stabilized and cross linked through exposure to the oxidative species in the chamber at a selected temperature. The polymer may be directly exposed to the plasma, or alternatively, the plasma may be established in a separate volume from which the reactive species may be extracted and introduced into the vicinity of the polymer. The apparatus may be configured for either batch-type or continuous-type processing. The apparatus and method are especially useful for preparing polymer fibers, particularly PAN fibers, for later carbonization treatments.

18 Claims, 5 Drawing Sheets

OTHER PUBLICATIONS

D'Agostino, Plasma deposition, treatment, and etching of polymers, 1990, pp. 321-367, Academic Press, San Diego.

Kroschwitz, High performance polymers and composites, 1991, pp. 20-39, John Wiley, New York.

* cited by examiner

2A

2B

APPARATUS AND METHOD FOR OXIDATION AND STABILIZATION OF POLYMERIC MATERIALS

CROSS REFERENCE TO RELATED APPLICATIONS

This application is a continuation of U.S. patent application Ser. No. 11/344,573 filed on Jan. 31, 2006, now U.S. Pat. No. 7,534,854, which claims the benefit of Provisional Patent Application Ser. No. 60/666,301 filed by the present inventors on Mar. 29, 2005.

STATEMENT REGARDING FEDERALLY SPONSORED RESEARCH

This invention was made with Government support under Contract No. DE-AC05-000122725 awarded by the U.S. Department of Energy to UT-Battelle, LLC, and the Government has certain rights in this invention.

BACKGROUND OF THE INVENTION

1. Field of the Invention

The invention pertains to apparatus and methods to treat polymeric materials, and more particularly to systems and methods for plasma assisted oxidation and stabilization of thermoplastic materials in preparation for high-temperature carbonization.

2. Description of Related Art

The production of carbon fibers from thermoplastic-based fibers, e.g., polyacrylonitrile (PAN), is typically a multi-step process in which the PAN fibers are first treated in an oxidizing atmosphere at temperatures ranging from ambient up to about 250-300° C., while the fibers are maintained under tension inside of large furnaces. The oxidized fibers are subsequently carbonized at temperatures up to about 1000-1200° C. in an inert atmosphere (carbonization step) and then further heated up to about 3000° C. (graphitization step). Traditionally, the first oxidation or stabilization processing step is the most time-consuming and rate-limiting step in conventional carbon fiber manufacturing, and it requires more space than all other steps combined.

Several methods for PAN-precursor stabilization are known. The most common method is stabilization in air, which usually requires hours to achieve full stabilization. Here the PAN-precursor may be heated in air at a carefully controlled rate up to 250° C. either in a batch process or by heating the precursor tow continuously as it is transported through a furnace or kiln, which contains several temperature zones. Much development work has been directed toward the goal of modifying the conventional stabilization step and reducing the processing time. For example, numerous publications indicate that the stabilization rate can be enhanced by modifying the chemical composition of the precursor fiber either by the use of an additive (co-monomer), or by selective pretreatments such as impregnating with specific chemicals [see Leighton H. Peebles, "Carbon Fibers, Formation, Structure, and Properties," CRC Press, pp. 7-26 and 128-35, 1994].

Early methods for stabilizing PAN fibers are taught by Houtz in U.S. Pat. Nos. 2,789,915, 2,913,802, 3,027,222 and 3,125,404, wherein oxidation of PAN under controlled temperature of 220-250° C. for several hours produced infusible material. The fibers, in general, acquired stability by an oxidation and cross-linking process. Oxidized PAN was converted commercially to carbon fibers in the early 1960s. Details are described by Tsunoda in U.S. Pat. No. 3,285,696.

It was indicated in these patents that direct heating of PAN fibers to 1000° C. in a non-oxidizing atmosphere (nitrogen) produced a brittle, low-strength fiber product. However, with a prior pretreatment step, a much stronger fiber was obtained when this material was subsequently processed to 1000° C. [see John Delmonte, "Technology of Carbon and Graphite Fiber Composites," Van Nostrand Reinhold Co., New York, p. 55-61 and 190-1, 1981].

The technical literature indicates clearly that stabilization or oxidation treatment is the most critical processing step for determining the final properties of the manufactured carbon fibers. Economic estimates indicate that the stabilization step represents at least 20% of the total product cost and more than 30% of the total processing cost, and 70-85% of the total fiber processing time.

U.S. Pat. No. 3,699,210 teaches the use of laser sources for the carbonization and graphitization of PAN that had been fully oxidized at temperatures ranging from 180-500° C.

U.S. Pat. No. 3,914,394 teaches the use of ultrasonic waves in a liquid medium on fiber that had been pre-oxidized at temperatures below 400° C. After carbonization, the fibers had a higher strength and higher modulus of elasticity.

Many patents teach the treatment of the virgin and/or partially oxidized fiber with stabilization/oxidation promoting chemical agents, Early examples include U.S. Pat. Nos. 3,933,986; 3,820,951; 3,817,700; 3,814,577, 3,720,759, and 3,708,326. More recent examples include U.S. Pat. Nos. 6,733,737; 6,054,214; and 5,804,108.

U.S. Pat. No. 4,197,282 teaches the use of microwave energy only (rather than plasmas) to couple energy into pitch-based fibers (PAN based fibers do not couple microwave energy due to an extremely low value in the dielectric loss factor over a wide frequency range). The '282 patent therefore only applies to fibers that contain a sufficient quantity of carbon in the precursor to enable the efficient coupling of microwave energy into the fiber material. Furthermore, '282 is directed to the carbonization and graphitization of pitch-based fibers, not the oxidation or stabilization of thermoplastic materials such as PAN.

U.S. Pat. Nos. 5,412,246 and 5,330,935 are directed to forming a thin film on the surface of a semiconductor device and not to the carbon fiber production process.

U.S. Pat. No. 6,372,192 teaches the combined use of microwave energy and microwave based plasma for the carbonization and graphitization of carbon fiber. That work was independent of precursor material, but is limited to the carbonization and graphitization of materials that already have been substantially or fully oxidized/stabilized by some other means. The scope of '192 does not address the initial and broad oxidation/stabilization production stage.

U.S. Pat. No. 6,514,449 teaches the use of microwave energy and plasma to modify the surface topography of carbon fiber. The scope of '449 does not relate to the any of the oxidation/stabilization, carbonization or graphitization stages of carbon fiber production process. General discussions of fiber surface modification may be found in several references [Mittal, K. L. and Pizzi, A., "Adhesion Promotion Techniques. Technological Applications," Marcel Dekker, pp. 67-76 and 139-73 (1999); D'Agostino, R., "Plasma Deposition, Treatment, and Etching of Polymers," Academic Press, pp. 321-67 (1990); J. B. Donnet, T. K. Wang, S. Rebouillat and J. C. M. Peng, "Carbon Fibers," Third Edition, Marcel Dekker, Inc., pp. 180-9 (1998)]. These teachings do not address stabilization or oxidation, but rather the modification of surface morphology or surface chemistry as a means of modifying interactions between fiber and matrix in a composite.

US Patent Application Publication No. 2003/0051993 A1 describes a "nonthermal capillary discharge plasma" device for activating various chemical reactions. Among other chemical processes, this patent application suggests the idea of applying the device to stabilize PAN fibers; however, the publication does not provide enabling details for a viable PAN stabilization process nor present evidence that the process has been successfully implemented.

OBJECTS AND ADVANTAGES

Objects of the present invention include the following: providing an apparatus for oxidizing and stabilizing thermoplastic materials prior to carbonization; providing an apparatus for more rapid and cost-effective treatment of PAN fibers by exposure to reactive oxidative species; providing a method for oxidation and stabilization of polymeric materials that is faster and requires less physical space; providing a method for stabilizing PAN fibers that creates a more uniformly stabilized fiber that can yield a more uniform product after carbonization; and, providing a method of polymer stabilization in which the polymer is contacted by a diffuse plasma in order to avoid the deleterious effects of a concentrated or filamentary plasma on the polymer. These and other objects and advantages of the invention will become apparent from consideration of the following specification, read in conjunction with the drawings.

SUMMARY OF THE INVENTION

According to one aspect of the invention, an apparatus for treating polymeric materials comprises: a treatment chamber adapted to maintain a selected atmosphere; a source of plasma-derived gas containing at least one reactive oxidative species; and, a means for supporting the polymeric material within the chamber at a location wherein the polymer will not contact a filamentary plasma discharge but will be exposed to the reactive oxidative species, whereby the polymer is stabilized and cross-linked through this exposure in the chamber at a selected temperature.

According to another aspect of the invention, a method for treating polymeric materials comprises exposing the polymer at a selected temperature to a source of plasma-derived gas containing at least one reactive oxidative species while avoiding direct contact between the polymer and a filamentary plasma discharge, whereby the polymer is stabilized and cross-linked through exposure to the oxidative species to a sufficient degree to render the polymeric material suitable for carbonization treatment.

According to another aspect of the invention, an apparatus for treating polymeric materials comprises: a treatment chamber adapted to maintain a selected atmosphere and having a first volume adapted to contain the polymeric material during treatment and a second volume wherein a plasma is established; a source of oxygen into the second volume, whereby reactive oxidative species may be created within the plasma; and, at least one opening between the first and second volumes whereby the reactive oxidative species may be transported to the polymer and the polymer may be stabilized and cross-linked through this exposure in the chamber at a selected temperature.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

DETAILED DESCRIPTION OF THE INVENTION

Figure 1:
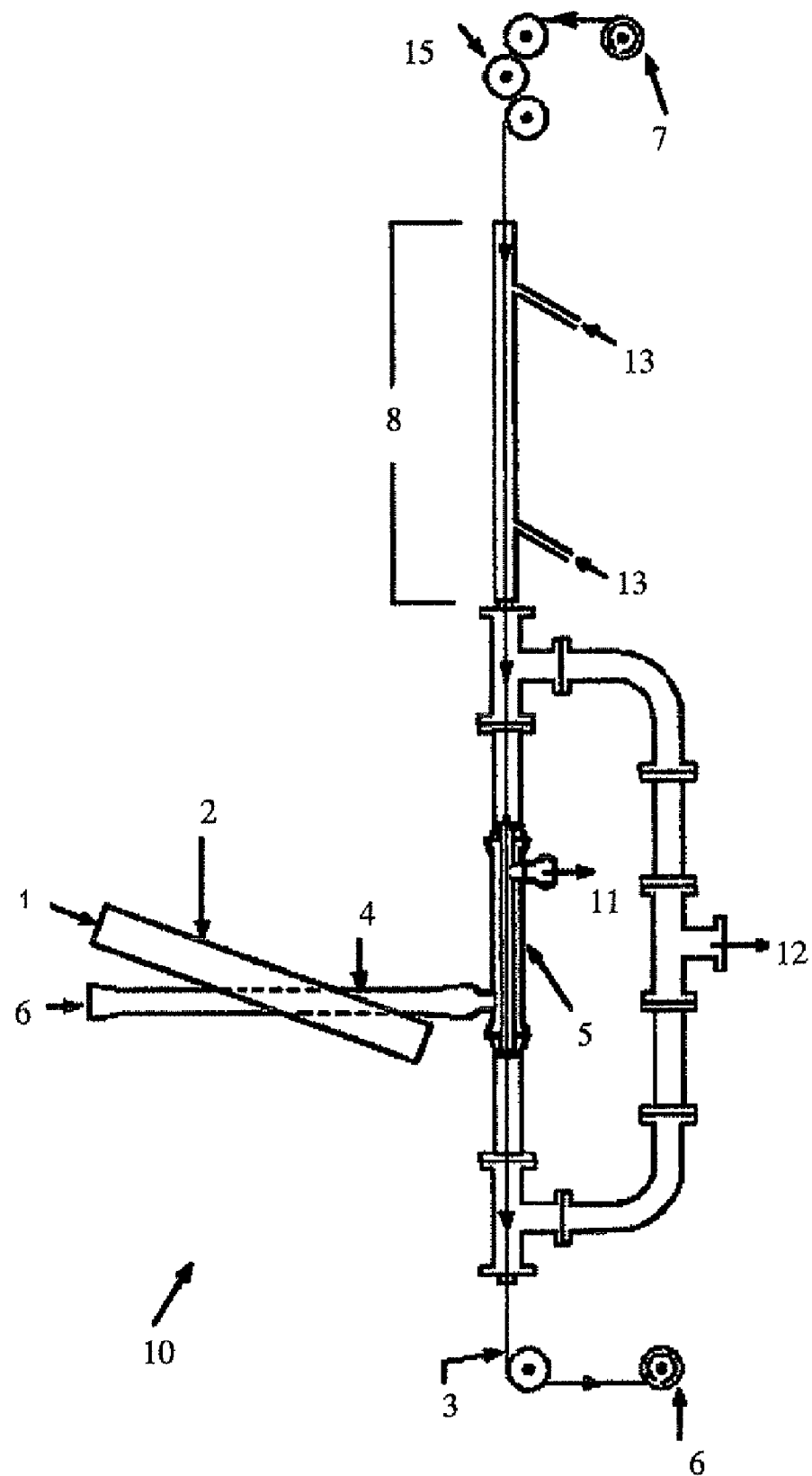
FIG. 1 is a schematic diagram of one embodiment of the apparatus of the present invention adapted for low pressure plasma processing.

The invention is a new technique to increase the speed of oxidation or chemical cross-linking of PAN fibers or other polymeric materials. This technique is based on the use of reactive oxidative species (ROS), such as monatomic oxygen (O), instead of diatomic molecular oxygen ($O_2$), to increase the rate of diffusion of oxygen into the polymer so that unreacted, non-oxidized material inside of the fibers may be more efficiently treated. By increasing the overall rate of diffusion, more oxygen will be available to complete the second sub-phase of oxidation in the thermosetting phase in the manufacturing of PAN-based carbon fibers. One particular reactive oxidative species, atomic oxygen, not only has half the mass of molecular oxygen but also is much more chemically reactive and will not need to dissociate after diffusing into the required unreacted interior region of the fiber before it can react with the PAN.

As will be apparent from several examples provided herein, the invention may be carried out either by directly exposing (immersing) the polymer within an oxygen-containing plasma or by creating the plasma in a separate volume and then transporting the ROS to the vicinity of the fiber. In either embodiment, a key aspect of the invention is the ability of the ROS to greatly enhance stabilization and oxidation of the polymer in preparation for later carbonization treatments.

Experimental processing and evaluation of processed fibers demonstrate the validity of this new oxidation processing technique. The inventive oxidation process preferably generates the necessary ROS using non-thermal atmospheric pressure plasma (APP). The non-thermal atmospheric pressure plasma is based on a spatially-uniform discharge plasma. This oxidative technique also demonstrated the capability, starting with partially oxidized PAN precursor, to advance the oxidation process to fully oxidized or if desired, to an intermediate level of oxidation (density) of the PAN-fibers.

In addition to creation of ROS, the PAN fiber production process using this new atmospheric pressure plasma technique exhibits a different diffusion transport mechanism for the ROS promoting the oxidization/stabilization process, compared to the diffusion transport mechanism of the conventional fiber production process. During conventional processing, the PAN fiber exhibits two different well-defined radial zones: a semi-processed or unprocessed core and an outer processed layer effectively encasing the core. The semi-processed core has been only chemically stabilized by the initial thermal process of the PAN material and is awaiting oxidative treatment. The encasing processed layer is a hardened layer comprising oxidized material that is fully cross-linked. Well known methods have been developed that use various solvents to selectively etch the semi-processed core, whereby the amount of semi-processed or unprocessed material may be quantitatively evaluated and related to processing variables.

Contrary to the conventional process used in industry and taught by the technical literature of the field, analysis shows that the fibers processed by the inventive APP process do not exhibit these two different well defined zones, but rather exhibit a continual gradient of cross-linked material inward towards the center of the filament. This indicates that the new APP process enhances penetration of the ROS towards the core of the filament and brings about a more rapid oxidation process.

The present invention is directed specifically to the stabilization or oxidation processing step. The main variables that govern or strongly affect the (chemical) processing during stabilization include the following: oxidizing medium, e.g., oxygen; rate of heating; residence time, temperature; composition and condition of the PAN-precursor; and tensioning or drawing of the precursor while processing. All these variables will directly or indirectly affect the chemistry of the transforming PAN precursor from a thermoplastic linear polymer system to an infusible, highly-condensed cyclized (ladder structure) thermoset.

The chemistry of PAN during the oxidative stabilization process is very complex. The PAN-precursor undergoes a sequence of complexes and interrelated chemical reactions such as chain scission, cross-linking, dehydrogenation, etc. resulting finally in an intra molecular polymerization of nitrile groups or cyclization reaction. The kinetics and mechanisms for the conversion of polyacrylonitrile to a cyclized ladder structure have been investigated thoroughly and much literature has been published by workers in this field. The literature clearly indicates that cyclization into the ladder-structure polymer depends upon the atmosphere in which the heat treatment or stabilization was carried out. As previously noted, when the stabilization is carried out in a nonoxidizing atmosphere, it takes a considerable amount of time (hours) to completely transform the fiber to a brittle, weak material. When this stabilization process is conducted in an oxidizing medium (e.g., air) the rate of cyclization is much higher and the finished carbon fiber properties are improved. When PAN-fibers are heated in a controlled oxidizing atmosphere to about 250° C. under tension, for sufficient time, several thermally activated processes take place, causing considerable reorganization of the polymer chain and three-dimensional linking of the parallel molecular chains by oxygen bonds. The presence of oxygen, i.e., an oxidative atmosphere, thus accelerates the processes of stabilization. The chemical reaction of "cyclization" can be effected purely thermally, but when PAN is heated in an oxidizing medium, the rate of the chemical reaction is dearly higher, producing a stable, infusible material suitable for further processing at higher temperatures. On the other hand, if PAN-polymer is heated rapidly, an uncontrolled release of heat (a violent exotherm), possibly on a large scale, can occur with catastrophic results, such as chain fragmentation into an assortment of monomers and oligomers, as well as the evolution of large quantities of hydrogen cyanide and ammonia. This exothermal reaction is due to the uncontrolled thermal polymerization of the nitrile groups with the release of the heat of polymerization, ca. 2.5 KJ/gm of PAN. For this reason, the process is usually run in a regulated manner to promote a slow, controlled polymerization and heat release. In the standard industrial process, the progress of stabilization is typically indicated by fiber density, which, for PAN, increases from about 1.2 $g/cm^3$ in the virgin state to about 1.4 $g \cdot cm^3$ in the fully oxidized state.

Although some controversy exists in the technical literature about the kinetics and mechanisms for the stabilization/oxidation of PAN, the following statements can be made with a high degree of certainty: First, oxygen promotes the initiation of cyclization (the exothermic reaction starts at a lower temperature) and this initiation involves chain scission and formation of initiator sites. Second, as the temperature is increased the overall kinetics of the stabilization process is increased. Third, oxygen participates in a number of intermediate reactions and cross-linking reactions. Finally, an oxidative atmosphere promotes dehydrogenation reactions that lead to a conjugated and planar backbone structure, which together with cyclization, yields a sheet or layer structure that promotes graphitization during the subsequent carbonization steps.

The initial chemical reactions of the stabilization process are highly temperature dependent and the subsequent oxidation process is diffusion-controlled. The initial stabilization is effected purely thermally and depends on the physical state of the polymer, the presence of additives (such as comonomers), by-products and traces of initiators from the original PAN-polymerization, end-groups, and also ionic groups or ionic elements, which have been introduced during the manufacturing and spinning of the fibers. The oxidation or diffusion-controlled stage is more affected by the mechanics and kinetics of the general conversion process. At this stage, the rate of oxidation of PAN is controlled by diffusion of (molecular) oxygen, and the time required is proportional to the fiber diameter being processed. (For example, at 220° C., in circulating hot air, the processing time is about 5 hours for a 13-µm diameter fiber.) The literature indicates that in the "diffusion-controlled" phase the time required for processing is proportional to the square of the fiber diameter, in keeping with conventional diffusion theory. In general, as stabilization progresses, the components responsible for the heat generation are consumed, and the rate of heat generation decreases. With time, a fairly dense skin structure forms in the outermost region of the fiber. At this point the chemical reactions occur more slowly, as the diffusion of oxygen to the reactive sites or interior regions of the fiber is limited by previously oxidized, rigid and denser material. To illustrate this, indications in the literature suggest that the diffusion of oxygen through fully "stabilized" fiber is some 300 times slower than through unoxidized fiber. Another illustration of this diffusion controlling process is shown in British Patent 1,251,822, which describes a commercial process to heat PAN fibers for 7 hours at 220° C. in order to promote total and complete diffusion of the oxygen into the fiber. Complete oxidation is important because if partially oxidized PAN precursor filaments are subjected to the subsequent carbonization stage of processing without full oxidation, the resulting final product will be unacceptable.

A method for visualization of the skin/core structure has been described as follows [see L. H. Peebles, "Carbon Fibers, Formation, Structure, and Properties," CRC Press, 1994]: "The acrylic precursor is soluble in hot aqueous sulfuric acid. Polymer that has been heat-treated in the absence of oxygen but contains no discernable nitrile groups by infrared analysis is also soluble in sulfuric acid. However, polymeric material that has undergone stabilization reactions in the presence of oxygen is not soluble." Polymeric material that is only chemically stabilized and has very low amounts of 2D-crosslinking, such as the initial ladder structure, is typical of the very initial step in the oxidation process (chemical stabilization subphase). The 2D crosslinked structure that is interconnected to neighboring soluble regions is separated or removed as a particulate from the bulk of the material by the acid solution. Thus partially oxidized filaments have both soluble and nonsoluble regions, so the acid wash process applied to partially oxidized filaments yields a "pipe-like" structure. This chemical digestion process can therefore be used to evaluate differences in the conventional thermal stabilization process versus the plasma stabilization process with regard to the degree or efficiency of stabilizing the fiber through its entire thickness.

Applicants used the aforementioned method to examine a large tow (50,000 filaments) of PAN fibers partially oxidized in air by conventional thermal treatment and subsequently subjected to sulfuric acid digestion in reflux. Examination by scanning electron microscopy (SEM) clearly showed hollow tubular structures, indicating that the soluble core region had been removed from all the fibers, leaving only the fully stabilized skin layer. The PAN precursor used for evaluation came from standard industrial grade stock [Acordis Acrylic Fibres (formerly Courtaulds), P.O. Box 24 Great Coates, Grimsby, United Kingdom, DN31 2SS].

Figure 2:
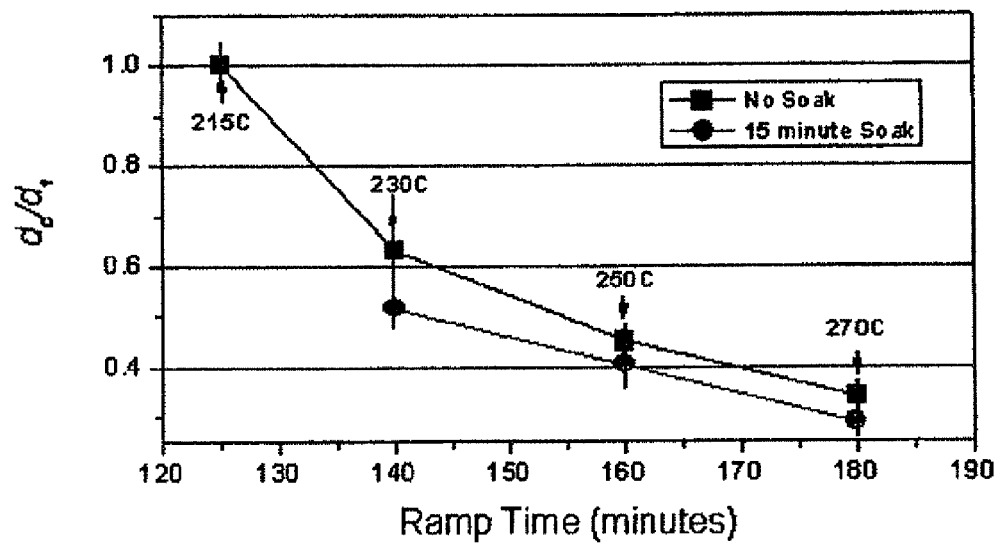
FIG. 2A is a graph showing the ratio of the unoxidized core diameter to the filament diameter as a function of processing temperature for a conventional fiber stabilization process.
FIG. 2B is a graph showing unoxidized core diameter as a function of density for the inventive process and for the conventional process.
Figure 2:
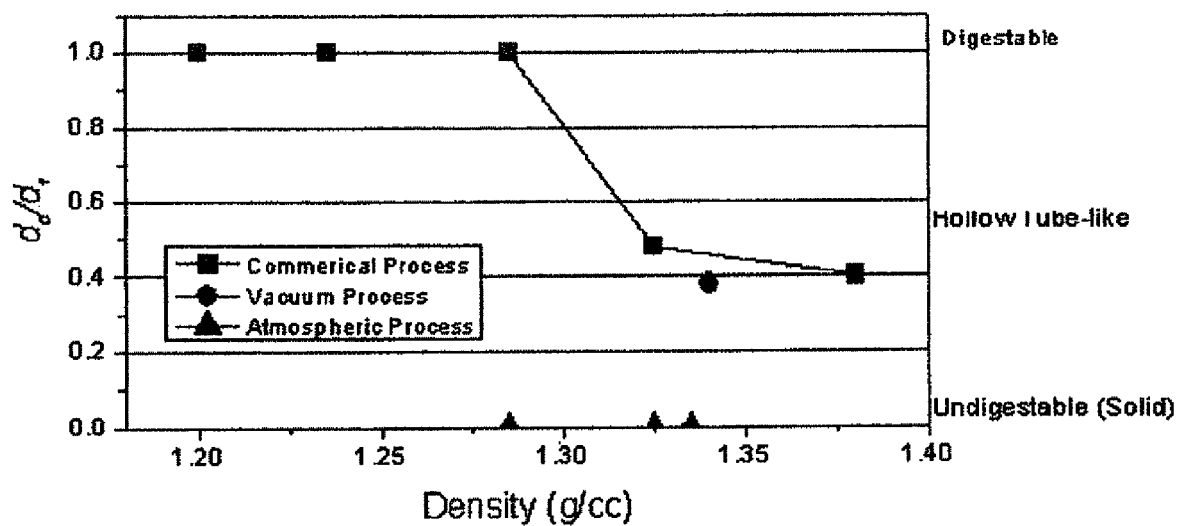

The progressive formation of the dense surface layer during conventional oxidation was then investigated and the results are presented in FIG. 2A. All samples were ramped at a constant temperature rate (1° C./min) from a preheated oven temperature of 90° C. to a specific processing temperature. The upper curve represents samples that were immediately removed from the oven after attaining the specific processing temperature (not subjected to a soaking or holding time). The lower curve represents the same processing conditions, except that after the samples reached the maximum specific ramp temperature, the samples were held in the oven for an additional soaking time of 15 minutes. Analysis of the top curve in FIG. 2a indicates that when the samples are subjected to more heat treatment, i.e. longer processing time, the size of the central unoxidized core decreases, as expected. The additional reduction of the core is reaffirmed by the lower curve. In this case the oxygen has an additional period of time for diffusion into the filaments. These results validate the concept of forming two regions in the filaments during the conventional oxidation process used commonly in the carbon fiber industry.

The present invention is directed primarily toward the use of plasma processing, both low-pressure and atmospheric, in a chemically oxidative process. However, the inventive technique may also be suitable for situations in which it is desired to enhance the kinetics of a non-oxidative cross-linking process. Thus, for a selected precursor, either thermoplastic or thermoset, the inventive process may induce rapid cross-linking throughout the thickness of the material and provide useful stabilization results in an oxidative or nonoxidative environment selected by the operator based on the specific material and process goals. It is of particular interest for thermoplastic precursors such as PAN and other chemically modified precursors.

The following examples employed the same PAN precursor throughout all the experiments [Standard Modulus Precursor, 3000-filament tow, Hexcel Corp., 3300 Mallard Fox Dr., Decatur, Ala. 35609], in order to eliminate all the processing variables related to the precursor generation and spinning. Only variables pertaining to the oxidation or stabilization process were considered. Those skilled in the art will appreciate that the general principles and methods taught herein may be easily adapted to other precursor fibers with minimal additional experimentation and optimization. The initial phase of the fiber stabilization process is the chemical stabilization, which is a chemical reaction-controlled sub-phase occurring purely thermally (i.e. cyclization of the nitrile groups is thermally spontaneous and highly exothermic). The invention most strongly influences the diffusion controlled sub-phase of the overall oxidation process thus limiting the pertinent processing variables to the effects of the oxidizing medium and the diffusion limited chemistry that governs the production process.

As noted above, many different approaches have been evaluated to reduce the required long processing times in this step. The majority of these approaches met with limited success. The present invention represents a new technical approach based on plasma technology and delivery of reactive oxidative species (ROS) such as atomic oxygen as the oxidizing medium. The basic idea is to be able to accelerate the rate of diffusion of ROS through the hard, dense oxidized fiber "skin" (that grows with process time) and inward to the region of stabilized, but not yet oxidized, material. After earlier work in which (low-pressure) plasma processing was used in different operations relating to carbon fiber production (see Paulauskas et al., U.S. Pat. No. 6,372,192), Applicants began a search for a viable plasma-based process suitable for oxidizing PAN fibers. In an early test, Applicants provided virgin PAN fiber to be treated in the nonthermal plasma discharge device disclosed in U.S. Patent Application Publication No. 2003/0051993. After treatment, the fiber showed several clear defects that rendered it unsuitable for further processing. Specifically, the fiber treatment was visually nonuniform, with some areas severely blackened and others clearly much less processed. Furthermore, there were significant amounts of charring and catastrophic breakage of the tow. Based on these discouraging results, Applicants postulated that localized concentrations of current density (or "filaments") within the plasma, which might not present problems in some chemical reactions, nonetheless were sufficiently energetic to cause catastrophic damage to the small, virgin PAN fibers. Applicants therefore began research to develop a plasma process in which the plasma current density was sufficiently diffuse that it could safely oxidize PAN fibers without damage.

In order to provide a better understanding of the theoretical basis for Applicants' approach, the following discussion of filamentary versus non-filamentary atmospheric pressure plasma discharges is provided. [Reference is made to Rahel, J., and Sherman, D. M., "The transition from a filamentary dielectric barrier discharge to a diffuse barrier discharge in air at atmospheric pressure", J. Phys. D: Appl. Phys. 38 (2005), the entirety of which is incorporated herein by reference.] As known by those skilled in the art of plasma physics, atmospheric pressure plasma discharges can be classified into two categories based on the fundamental nature of the plasma discharge. Filamentary discharges are composed of microfilaments of current, pinpoint-like in character, that have localized energies sufficiently high to cause damage to delicate substrates in contact with the filamentary plasma discharge. Uniform treatment of a sample placed in such discharge requires some means of spatial averaging, and even then there is a tendency to overly damage the sample. Examples of filamentary plasma discharges would include corona, dielectric barrier discharges, and slot or micro-hollow cathode discharges. Atmospheric pressure non-filamentary discharges are plasma devices in which the pinpoint-like character of the current within the plasma is absent. This can be accomplished by a variety of mechanisms, such as operating the plasma comprising inert gases, operation within an after-glow of a plasma device, or tailoring the plasma discharge characteristics such that the filamentary structure is suppressed or diffused. The last mechanism is the operating principle on which the so-called OAUGDP® technology (U.S. Pat. Nos. 5,387,842 and 5,414,324) is created. Examples of non-filamentary or diffuse plasma discharges would include low pressure glow discharges, diffuse barrier discharges, the after-glow of atmospheric pressure jet discharges and similar discharges.

Distinguishing between a filamentary plasma discharge and a non-filamentary discharge in most cases can be accomplished by visual inspection if the plasma device is configured such that the one or both of the electrodes is transparent. Using a transparent electrode allows for the light emission from the plasma to be seen both the human eye and by a photomultiplier tube. Both the current waveforms and the photon emission for both a filamentary dielectric barrier discharge (FDBD) and a diffuse (non-filamentary) barrier discharge (DBD) contain features that may be used to readily distinguish the two types of discharge, as discussed in detail in the cited reference [Rahel and Sherman (2005)].

The oxidative chemistry required to conventionally process the precursor is fundamentally complex, so the addition of plasma processing increases the degree of complexity of the overall process kinetics. This added complexity arises from the generation of gaseous concentrations of both short-lived and excited gas species as well as energetic photons. The additional ROS and photons dramatically alter the overall reaction kinetics governing the oxidative process. Experimental testing with a variety of gas mixtures confirmed the importance of including oxygen during the process. Unless oxygen reaches the still non-oxidized regions, the oxidative process cannot occur or continue.

The following simplified comparison is useful for understanding one of the basic benefits of the new process. A simplified diffusion model for molecular oxygen versus atomic oxygen supports the basic concept that the use of ROS can enhance the rate of diffusion, if the short mean free path for a reaction between atomic oxygen and the PAN can be ignored. It is well understood that the relative velocities of diffusion of two species through a membrane or medium is generally proportional to the inverse square roots of their masses. In our specific case of the diffusion of oxygen, the relative velocity of diffusion of atomic oxygen to that of molecular oxygen is therefore 1.414 (the square root of 2). Thus, atomic oxygen will diffuse 40% faster than molecular oxygen, all other things being equal. A comparison of atomic radii of different candidate gases clearly indicates that a single oxygen atom (0.65 angstroms for oxygen versus 0.92 angstroms for nitrogen) is the smaller; consequently atomic oxygen will encounter less resistance to diffusion into the material. In addition, the plasma will provide further beneficial effects: the energy required to dissociate diatomic oxygen ($O_2$) into two oxygen atoms (O) is 498 KJ/mol at 298° K (950 KJ/mol for nitrogen) and the plasma system will be able to deliver more than the required energy for these ionizations. The plasma system could furthermore accelerate the active ions toward the fiber, as well as establish a controlled plasma density in the chamber and possibly around the fiber tow. The high temperature generated in the plasma will significantly increase the average mean velocity of the atomic oxygen when compared with corresponding velocity of the molecular oxygen in the conventional carbon fiber stabilization process.

It will be understood that although air is a preferred working gas for the plasma device, other mixtures of processing gases comprising some oxygen mixture or oxygen containing gas may be suitable for particular applications. Examples include, but are not limited to: dry or moist air; nitrogen; oxygen; nitrogen oxides; carbon dioxide; helium, argon, or other inert gases; hydrogen and hydrogen-containing gases including ammonia; and mixtures thereof. Reactive oxidative species that may be created by the plasma source include the following: $O_2$, $O_x$, O, $N_xO_y$, $H_xO_y$, as well as ions, radicals, excited states and metastables of any of the precursor gases.

In addition to the production of reactive oxidative species, plasmas can have beneficial ultraviolet (UV) photochemistry effects that can improve the fiber production. UV light can improve (or accelerate) the diffusion in regions where the UV photons can penetrate, particularly on the near-surface regions of the fibers. Additionally, the photon energy from UV radiation in the plasma reactor can break most organic bonds and also initiate free-radical chemistry, which enhances the sequential oxidative reactions. The UV emission spectra from a variety of plasma sources have been evaluated. Similar to the production of ROS, the production of particular emission spectra is complex and strongly dependent on experimental parameters such as the type of plasmas, gas composition, concentration of contaminants (including fiber effluents), input power, background pressure (which may require vacuum), and plasma excitation frequency.

The inventive method uses ionized gases and reactive oxidative species created by a plasma device for the rapid oxidation or crosslinking of PAN precursor. The plasma can be generated by a variety of different types of energy sources such as continuous or pulsed electromagnetic energy (i.e., DC, low-frequency, radio-frequency or microwave) discharges or photonic (i.e., laser) sources. Applicants have discovered that uniformity of the plasma in the vicinity of the fiber is very important to achieving good results and avoiding damage to the fibers. Note that as used herein, "uniformity" implies the absence of filamentary discharges in the vicinity of the fiber itself; it will be understood that some gradient of plasma density (for example, in the direction of fiber travel) may be present and desirable in some cases. The ionized gases comprising the plasma can be created under a variety of conditions, forming many different types of plasmas that have different electrochemical and photonic spectral characteristics. Features and characteristics of the plasma relevant to the oxidation of the PAN precursor include the specific resulting gas species concentrations, gas species lifetimes, energy densities, thermal properties, and the photon emission. E.g., the typical vacuum plasma features a low density/pressure of the background gases and the chemically reactive oxidative species have a large mean free path, lower collision rates, and generally longer average lifetime.

Preliminary experiments used a vacuum remote applicator in which the plasma chemical ROS were created in a low-pressure microwave discharge plasma. The ROS were then piped, via quartz plumbing and manifolds, and property distributed for the treatment of fibers. These results demonstrate the conceptual ideas of the diffusion-controlled sub-phase, and their effect and consequences on the oxidative stabilization of PAN precursor were demonstrated. The effects of process parameters that promote the creation and concentration of these chemical ROS also accelerate the rate of the oxidative reaction on the PAN-fibers.

Example 1

Vacuum Pressure Plasma Processing

Figure 4:
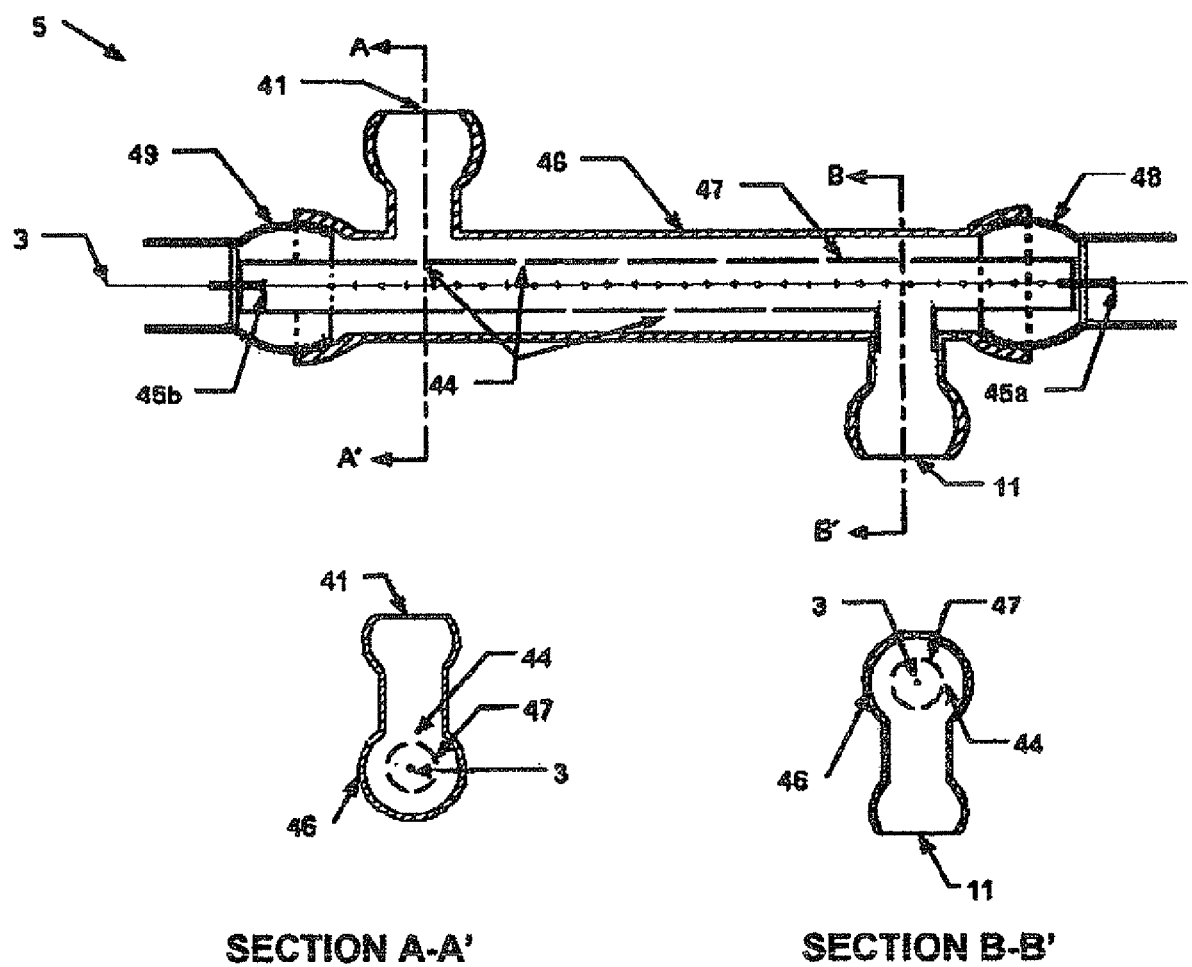
FIG. 4 is a schematic diagram of one arrangement for introducing reactive oxidative species into the chamber containing the fiber tow.

The general setup for vacuum based microwave glow discharge plasma treatment system shown at 10 in FIG. 1 consists of several different interconnected components including a microwave plasma generator 4, an applicator 5, a vacuum system, and a fiber transport system. A microwave generator supplies microwave power at 1 into a shorted waveguide 2 through which a quartz tube passes. The inlet process gases are introduced at 6. These gases, after being ionized by the plasma to form ROS, are fed to the applicator 5, which is a reaction chamber located downstream from the bulk of the plasma volume. This quartz reactor employs conventional connections for vacuum and connections at the other end for the supply of the ROS required for the processing. Several ROS applicators 5 were designed and tested with sequential improvements in the processing capabilities with each new design. The preferred design is illustrated in FIG. 4. The operating inlet gases were oxygen or a combination of oxygen with other gases. The ratio of oxygen to the other gases or the concentration or pressure of oxygen (when oxygen is used alone) was determined by experiments. The vacuum system pumping at 11 and 12 is capable of supporting a vacuum pressure inside the reaction chamber that was nominally 1 Torr, but other vacuum pressures may also be used depending on equipment design.

The fiber 3 is fed from a spool 7 off of the tensioning system (creel) 15 through the pre-heater stage 8, into the vacuum enclosure, through the applicator 5, and out to the take-up system 9. The tensioning system 15 was required to control tensioning while the take-up system 9 controlled the fiber processing speed. In general it is preferred that during treatment the fiber tow is kept in tension (typically 100 to 5000 g, depending on filament count and type of polymer). The pre-heater stage 8 consists of a glass tube with one or more air injection ports 13 (controlling both temperature and airflow).

The 6-kW, 2450-MHz microwave generator output is fed at 1 into a section of WR-430 waveguide (4.30" wide by 2.15" a high) in the dominant TE10 rectangular waveguide mode. The waveguide 2 has a 1" OD quartz discharge tube inclined at an angle of 20 degrees to the waveguide axis. The quartz tube enters one broad wall (4.30") and exits the opposite broad wall of the waveguide. This is done to taper the plasma load to minimize microwave reflections toward the generator. Almost all the microwave energy is absorbed on the first pass through the plasma, so that the end of the waveguide can be shorted with a metal screen, which reflects any unabsorbed microwave energy for a second pass through the plasma. The screen also allows hot air to exit the applicator, which acts to cool the hot quartz discharge tube. The process gases, usually a mixture of oxygen and nitrogen, are fed into one end of the quartz tube at 6. The other end of the quartz tube is connected to the applicator 5 and vacuum system. Microwave energy breaks down the gas at a few Torr in pressure, and atomic oxygen is produced and flows "downstream" away from the plasma and into the quartz manifold and pumping system. The advantage of this approach is that the high temperature plasma is remote from the delicate PAN precursor (virgin or partially stabilized) to be oxidized, and the atomic oxygen can be piped and distributed like a fluid along the length of the quartz manifold that surrounds the PAN tow.

FIG. 4 shows one design of the plasma applicator indicated at 5 in FIG. 1. The fiber 3 passes through inlet and exit seals 45a and 45b. Gases from the plasma enter at 41 and exit at 11. The outer casing is a quartz tube 46; and a second quartz tube 47 is locating concentrically within the outer tube. Holes 44 in the inner tube allow the gas to enter the inner tube at many points along its length and around its circumference. Conventional vacuum connections 48 and 49 are provided at the ends of the applicator. This design allows for either batch or continuous processing of the PAN precursor. Depending on the configuration of the seal system this applicator can be operated anywhere from low pressure (vacuum) to high pressure (atmospheric).

Initial testing attempted to place the virgin precursor directly downstream of the plasma bulk within the vacuum chamber, resulting in the "remote" treatment of the fiber by the ROS generated by the plasma. Results from these tests indicated a run-away reaction in the entrance area, i.e. immediate vicinity of application of ROS generated from the plasma, onto the fibers. The fiber tow in this region reacted violently because of both the extreme concentration of ROS, and the extreme exotherm of the initial chemical reactions (nitrile reaction) of the stabilization. Processing within the vacuum pressure environment afforded limited possibilities for extracting this heat. Consequently, processing resulted in fibers that were discolored, burned, or melted and severed. To overcome these difficulties a moderate conventional pretreatment stage 8 was added. This new, purely thermal, stage produced a very low level of stabilization so that the fibers became both structurally and thermally sturdy enough so that these fibers could tolerate plasma treatment. As a consequence of this additional pre-heating stage, part of the exothermic reaction was transferred to the outside of the vacuum chamber where airflow could be used to moderate the fiber temperature increase using controllable pre-heaters with set-points typically 150-160° C., injecting the heated air through ports 13. It will be appreciated that other types of pretreatments may be used instead of or in addition to heated air in order to initiate some (possibly exothermic) reactions before the fibers enter the main treatment chamber 5. These other treatments may include ultraviolet (UV) irradiation, infrared or microwave heating, and electron beam or gamma irradiation.

Table 1 shows some typical results from the research utilizing a vacuum pressure plasma process. For example, not shown in the table, gas compositions ranging from synthetic air to pure oxygen were evaluated as part of this research effort. All the samples in Table 1 were run with the preheated temperature profile from 150-160° C. and tow tension set at 180-220 g. Sample densities before and after plasma treatment were measured with a pycnometer. The gas was a mixture of oxygen and nitrogen (either 80/20 or 90/10).

TABLE 1

Increase in PAN fibers (3,000 fiber tow) density due to processing with a vacuum-based microwave plasma device.

| Sample | Density before plasma, g/cm³ | Density after plasma, g/cm³ | Gas mixture $O_2/N_2$ | Net Power, W | Pressure, Torr | Tow speed, cm/min |
| --- | --- | --- | --- | --- | --- | --- |
| 1 | 1.1483 | 1.22 | 80/20 | 110 | 1.2 | 3.2 |
| 2 | 1.1898 | 1.24 | 80/20 | 122 | 0.8 | 1.6 |
| 3 | 1.1898 | 1.2-1.24 | 80/20 | 160 | 1.2 | 1.6 |
| 4 | 1.1898 | 1.26-1.28 | 80/20 | 180-225 | 2.25 | 1.6 |
| 5 | 1.1898 | 1.22 | 80/20 | 185 | 1.4 | 1.7 |
| 6 | 1.1898 | 1.24 | 80/20 | 207 | 1.4 | 1.7 |
| 7 | 1.1898 | 1.21 | 90/10 | 160 | 1.3 | 1.6 |

For industrial use, the plasma applicator preferably comprises an atmospheric pressure plasma system. While generally similar to a vacuum based plasma system, the atmospheric plasma does not require many of the pumps, seals, and the like needed for maintaining a vacuum in the processing area, and therefore tends to be less costly and more reliable. Depending on the reactor design, the fibers may be immersed directly within the plasma or within the vicinity of plasma volume. In the case of the fibers directly immersed into or in contact with the plasma, particular care is required to ensure that the plasma is spatially uniform to prevent localized current filaments from damaging the fibers. The possibility of fiber damage due to filamentation of the plasma may be prevented by placing the fibers in the vicinity of the plasma, but just outside the downstream edge of the plasma volume. In this location, the ROS generated by the atmospheric plasma is converted to the fibers to perform the required oxidation and stabilization.

A preferred embodiment of the atmospheric pressure plasma device is one in which the plasma is a non-thermal plasma discharge. Using a non-thermal plasma discharge implies that the temperature either within or near the plasma discharge will not be excessively hot. For some applications, even hotter thermal plasma discharges may be utilized to generate the ROS, provided that exhaust gas flow heat exchangers are added or the fiber is placed far enough downstream to minimize overheating.

As used herein, the term "atmospheric plasma" commonly refers to any kind of plasma discharge generated at atmospheric pressure. These discharges would include corona discharges, dielectric barrier discharges, resistive barrier discharges, capillary or hollow-cathode discharges, Townsend discharges, atmospheric pressure glow discharges, diffuse mode dielectric-barrier discharges, microwave discharges, arc-jets and arcs. Any of these plasma discharges could be utilized either volumetrically or as a surface discharge. The thermoplastic PAN undergoing the processing can be placed either within the volumetric aspect of the plasma or located downstream within the exhaust from the plasma discharge.

The term "non-thermal plasma" refers to a plasma where the energy used to ionize the background gas to create both the ion and electron populations is preferentially stored in the electron population, which has a low mass ($T_{gas} < T_i < T_e$), where $T_{gas}$ is the background gas temperature, $T_i$ is the ion temperatures and $T_e$ is the electron temperature. This establishes a low ion temperature and a limited transfer of energy to the background gas. The average energy level of the electrons has a nominal range of 3 to 5 electron volts (eV) although a high-temperature "tail" of the electron population distribution can be as high as 20 eV.

The term "thermal plasma" refers to a plasma where the energy used to form the plasma is stored in both the ion and electron populations, resulting in a high energy transfer to the background gas ($T_i \approx T_e$). The energy level of the species is typically greater than the energy levels observed for non-thermal plasmas.

It will be appreciated that the actual gas composition during plasma processing will depend not only on the nominal composition of the inlet gas mixture but also on the concentration of contaminants released during processing. When any polymer is exposed to plasma (especially an oxygen-containing plasma), the inlet gas can change dramatically from the initial condition of a pure inlet feed-gas into a contaminated processing gas. This contaminated process gas or "effluent" may be influenced by the combination of effluent off-gassing from the fibers, the reactor gas flow geometry, and the placing and movement of the fibers within the reactor. Considerable amounts of effluents can be generated depending on conditions. The effluent consists of volatile compounds of carbon, hydrogen, oxygen, etc., all of which can interact with the surface of the material being processed both chemically and energetically. To avoid excessive contamination of processing gas into plasma, a properly designed reactor system will supply fresh feed-gas to the plasma and/or a vacuum withdrawal or venting of the contaminated gases continuously during processing of polymeric materials.

Assuming similar processing conditions (same pressure, same gas composition, etc.), the effect of the plasma excitation frequency has been studied in prior plasma research. The visible and ultraviolet spectra or photoemission from plasmas energized by microwaves at 2.45 GHz, radio frequency at 13.56 MHz, or audio frequencies show important differences in ion and excited species concentrations, which result from their different electron energy distribution functions. All of these may alter the concentration and composition of the ROS produced by this process, and subsequently will affect the overall kinetics of the thermoplastic oxidative process.

As in any fiber treatment process, special attention should be given to controlling the alteration of the physical topography of the fiber. For example, moderated, well-controlled plasma processing can create a desired topography on the fiber surface, which is beneficial to the mechanical interlocking of fiber-matrix into a composite material as taught in U.S. Pat. No. 6,514,449. At the same time, there are possibly negative collateral effects to the fibers if overly aggressive or energetic plasma is used. For example, over-processing of the fibers very likely will result in erosion, ablation, degradation, and/or damage to the fibers. The engineering trade-offs involved in modifying the surface of polymer or carbon fibers are well understood by those skilled in the art.

A second preferred approach to oxidatively processing PAN fibers is the use of non-thermal, diffusive, atmospheric pressure plasma. Atmospheric pressure plasma processing can create very similar oxidative chemistry, yet does not require the expense of vacuum processing equipment, and has the advantage of being able to convectively cool the fibers during treatment. Of particular economic and technical interest is the use of either volumetric or surface generated diffuse dielectric barrier discharges. Non-thermal plasmas have generally lower energy cost than thermal plasma discharges and their lower energy density that is less likely to damage the fibers during the production process. Diffusive, or spatially uniform plasma discharges are preferred both so that the fibers are undamaged by localized current filaments and so that the processing gas is efficiently ionized. This is not meant to imply that thermal plasmas or filamentary plasma devices are not able to perform similar processing, particularly if the device is constructed such that the PAN fibers are processed at a sufficient distance away from the more destructive plasma sources. Applicants have performed a number of experiments with atmospheric pressure plasma processing using devices in which the fiber is in direct contact within the plasma. These experiments are described in the following Example.

Example 2

Atmospheric Pressure Plasma Processing

A variety of atmospheric pressure plasma devices have been built during the course of the present research effort. These devices are generally based on the approach taught in U.S. Pat. Nos. 5,387,842 and 5,414,324. These devices have consisted of various parallel electrode designs that have included parallel plates and rods. In these designs either one or both of the electrodes are insulated. The processing gas and PAN fiber was fed through a gap or spacing between the electrodes. The electrodes were energized with an audio frequency power supply and operated in such a manner as to promote a diffuse dielectric barrier type discharge.

Figure 3:
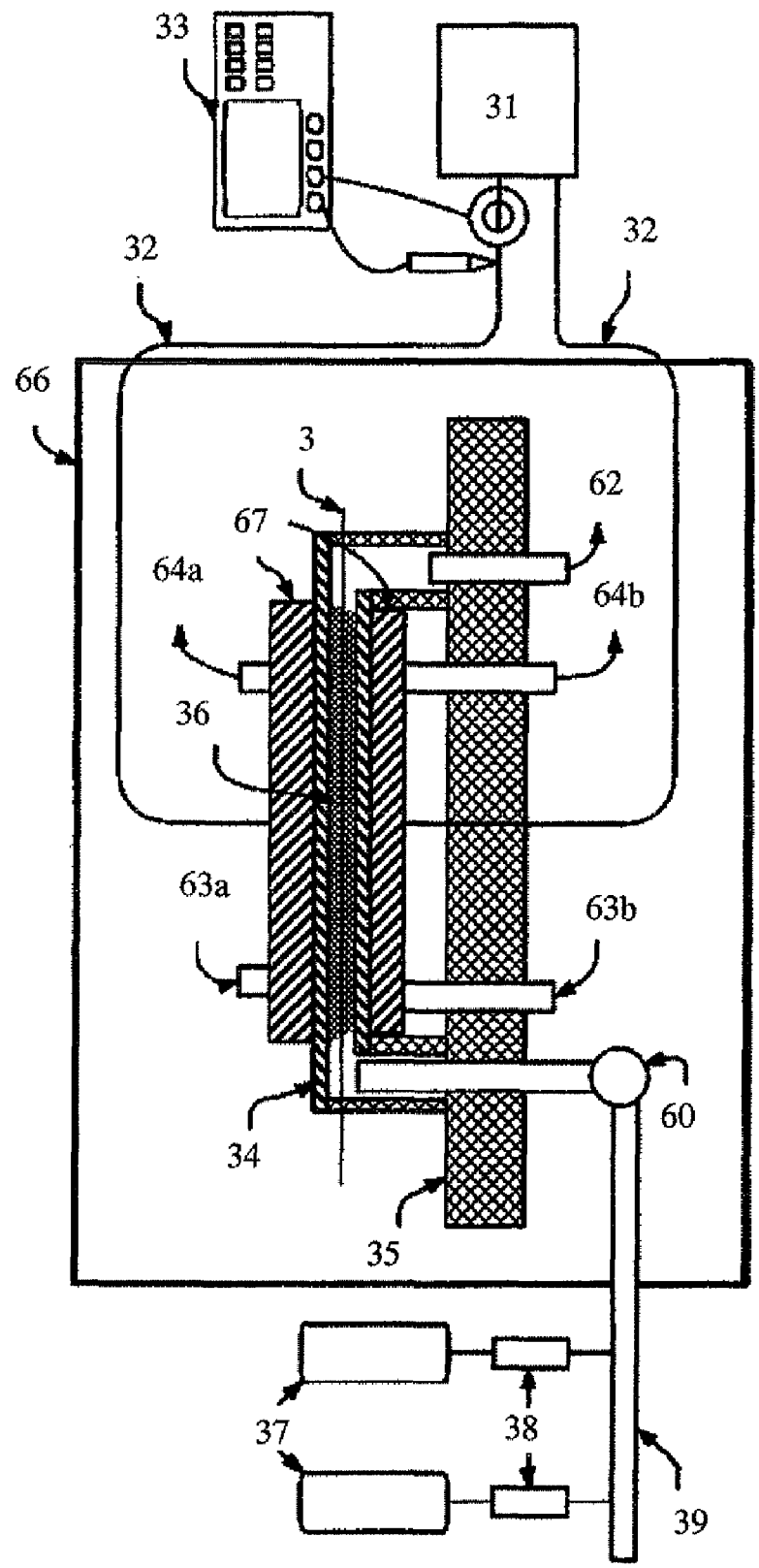
FIG. 3 is a schematic diagram of another embodiment of the present invention adapted for atmospheric pressure plasma processing.

The atmospheric pressure plasma processing equipment consists of a gas supply system, a plasma reactor, and a high voltage power supply as shown in FIG. 3. The gas supply system consists of a gas manifold 39 with connections for up to four different gas bottles 37 (two of which are shown) with independent meters 38. The gas manifold delivers temperature controlled, typically heated by heater 60, mixed gas to the plasma reactor. The plasma reactor consists of temperature controlled electrodes 67, (via a heated oil recirculated through their interiors through inlets 63a, 63b and outlets 64a, 64b), dielectrics 34, 35, and an enclosure 66. Dielectric materials included borosilicate glass, quartz, and alumina. The enclosure 66 for the plasma reactor is necessary both to manipulate the processing gas into and to exhaust gas out of the gap between the electrodes where the plasma is formed and the PAN fibers were processed. The high voltage system 31 consists of an audio amplifier or power inverter coupled to a high voltage transformer. The high voltage from the transformer is connected via high voltage wires 32 to the electrodes within the plasma reactor. Electrical diagnostics consisting of a high voltage probe and current ring connected to an oscilloscope 33 monitor the electrical parameters of power supply.

PAN fiber was placed into the plasma reactors (within the spatially uniform plasma volume) and processed at a variety of conditions to establish an effective set of parameters for oxidative stabilization of the PAN fiber. Some of the conditions have included: different reactor designs; different gas mixtures and flow rates; and different output voltages, frequencies and power levels. Process results were evaluated by a variety of test methods that included density change (primary method of analysis determined by a pycnometer), resistivity changes (via a network analyzer and precision ohmmeter), chemical alterations (via differential scanning calorimetry, DSC), and visual observation before and after acid etching (via SEM).

Before describing the experimental results in detail, it is useful to review the following typical commercial process, which can serve as a baseline to measure the benefits of Applicants' process. The conventional thermal oxidative stabilization process occurs via many discrete oxidative steps or stages, though in general it is limited to less than six ovens of increasing temperature. The nominal total processing time is dependant upon the recipe to yield a particular carbon fiber product, but it typically requires approximately 2 hours with oven temperatures that begin around room temperature and rapidly progress to as high as 250° C. As noted earlier, the density of the thermoplastic material, PAN precursor in this case, changes from about 1.2 gm/cm$^3$ initially to approximately 1.4 g/cm$^3$ at the end of the oxidation process. Prior work indicated that thermal oxidation at a temperature of 180° C. or below in air will require an extremely long time for oxidation of the PAN fiber. For example, experimentation has shown that even after 6 hours of thermal processing at a temperature of 160° C., the exothermic process of the oxidative process was still not complete.

To better understand the conventional thermal oxidative process, partially processed PAN fibers, from different stages (we arbitrarily chose four thirty minute stages) of the conventional thermal process were compared to plasma processed PAN fibers. By starting research with PAN precursor fibers that had already undergone some thermal processing, the chance of too rapidly heating or oxidizing the fibers was minimized and allowed for direct comparison of thermal processing versus plasma processing.

Several different plasma reactors were designed and evaluated to create a reactor capable of processing the thermoplastic precursor. The tables below show the results for two different types of plasma reactors, both consisting of parallel plate type electrode geometry. The first table below shows the density increase after treatment in 85% $O_2$/15% $N_2$ for temperatures substantially lower than in the conventional process. The second table shows density increase after treatment in 90% $O_2$/10% $N_2$, also at temperatures lower than the conventional process.

TABLE 2

Testing showing the density increase of plasma processed PAN fiber in 85%$O_2$/15%$N_2$

| Sample | Time, min | Inlet Gas Temp, ° C. | Density before plasma, g/cm$^3$ | Density after plasma, g/cm$^3$ |
|---|---|---|---|---|
| 1 | 30 | 180 | 1.235 | 1.2812 |
| 2 | 30 | 180 | 1.288 | 1.3240 |
| 3 | 30 | 180 | 1.325 | 1.3563 |
| 4 | 60 | 180 | 1.325 | 1.3874 |

TABLE 3

Testing showing the density increase of
plasma processed PAN fiber in 90%$O_2$/10%$N_2$

| Sample | Time, min | Inlet Gas Temp, ° C. | Density before plasma, g/cm$^3$ | Density after plasma, g/cm$^3$ |
|---|---|---|---|---|
| 1 | 30 | 180 | 1.235 | 1.2969 |
| 2 | 45 | 180 | 1.235 | 1.3119 |
| 3 | 30 | 210 | 1.235 | 1.3330 |
| 4 | 45 | 210 | 1.235 | 1.3634 |
| 5 | 60 | 210 | 1.235 | 1.3757 |

These tables demonstrate the conditions necessary to show a density increase corresponding to the advancement of oxidation for thermally processed PAN fiber precursor. The temperatures used to convert the PAN fiber can be substantially lower than the temperature required by conventional thermal processing. To insure the accurate measurement of the temperature within the reactor, fiber optic temperature probes connected to a signal conditioner were placed in the interior of the plasma reactor where the fibers were undergoing processing. After waiting 20 minutes with the plasma energized, the fiber optic temperature probe was drawn in small steps through the plasma within the interior of the reactor along the same location where the PAN fiber would normally reside. This test showed that under the same conditions in which the fiber was plasma treated the temperature was relatively constant (within a few ° C. of the inlet temperature). This measurement was repeated several times whenever the operating condition resulted in different gas inlet temperatures. Thus while processing time in the initial samples were comparable to the amount of time required by the conventional oxidative process, the temperature was shown to be 40-50° C. lower than the conventional thermal process. Similar data shows that at higher temperatures, the oxidation can be performed substantially faster at a temperature several tens of degrees lower than the conventional thermal treatment process. These results demonstrate that process time and temperature can be reduced through the use of plasma processing. Furthermore the plasma process, in contrast to simple thermal treatment, allows the operator to control many other parameters such as gas composition and gas temperature, as well as the design features of the atmospheric pressure plasma device (size of plasma volume, gap, dielectric materials utilized) as well the electrical parameters governed by the high voltage power supply (frequency, power, voltage). This gives the operator wide latitude to optimize the process for different precursor materials or different desired performance attributes in the final product.

In addition to density changes, some of the processed fiber was evaluated by acid etching as previously described. The fiber was placed in acid for 24 hours after plasma processing. Scanning electron microscopy images of the treated fibers showed, surprisingly, that the cores of plasma oxidized fibers are more chemically stable than are those of conventionally processed fibers. Specifically, commercially processed "fully stabilized" fibers were harshly boiled in 50% sulfuric acid for 24 hours. SEM images of the boiled fibers clearly showed that there is still two-zone morphology present, in which the diameter of the "core" region was about 10-20% of the total fiber diameter. By contrast, the same test was performed on fully stabilized fibers produced by the inventive atmospheric plasma treatment. The sample density was 1.3914 g/cm$^3$. The fibers were boiled in 50% sulfuric acid for 24 hours. SEM images clearly showed that there was no unconverted "core" material removed by the acid and we may therefore conclude that the plasma treatment eliminated the undesirable "two zone morphology" described previously. Specifically, the 2D-network (ladder structure) comprising the thermoplastic core that is usually not completely converted during the conventional thermal process had been substantially or completely oxidized. This suggests that plasma oxidation may allow the subsequent process of carbonization to begin at a lower fiber density, as shown graphically in FIG. 2B.

This surprising result is fundamental evidence that the chemically reactive species, ROS, produced by the plasma are better able to diffuse through the converted material, penetrating all the way into the core, and suggests why the oxidative stabilization can occur faster with plasma processing. This result implies that in addition to reducing processing time and costs for existing PAN fibers, the inventive process may also enable the development of larger-diameter fiber products that were not heretofore considered commercially feasible.

It will be appreciated that the optimal treatment temperature will vary from about 100 to about 400° C., depending mainly on the polymer being processed. For the specific case of PAN fibers, Applicants prefer to treat in the range of about 120 to about 300° C., and more preferably in the range from about 160 to about 280° C.

Example 3

Variant Atmospheric Plasma Processing Designs and Methods

Figure 5A:
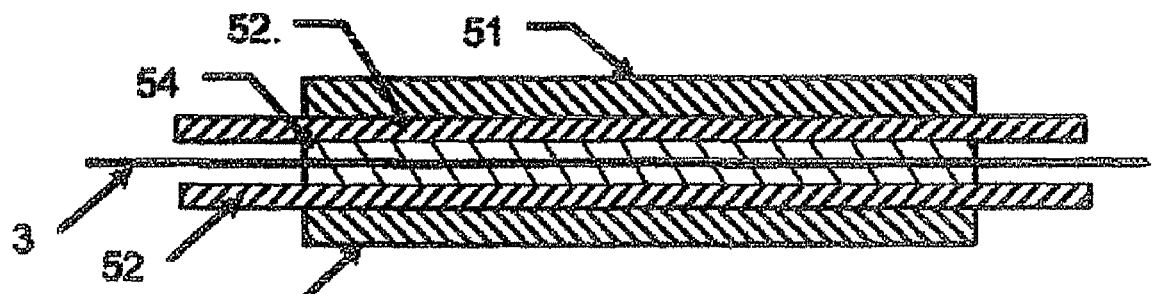
FIGS. 5A-5C are schematic diagrams of three alternate designs for exposing the fiber tow to plasma-derived reactive oxidative species.
Figure 5B:
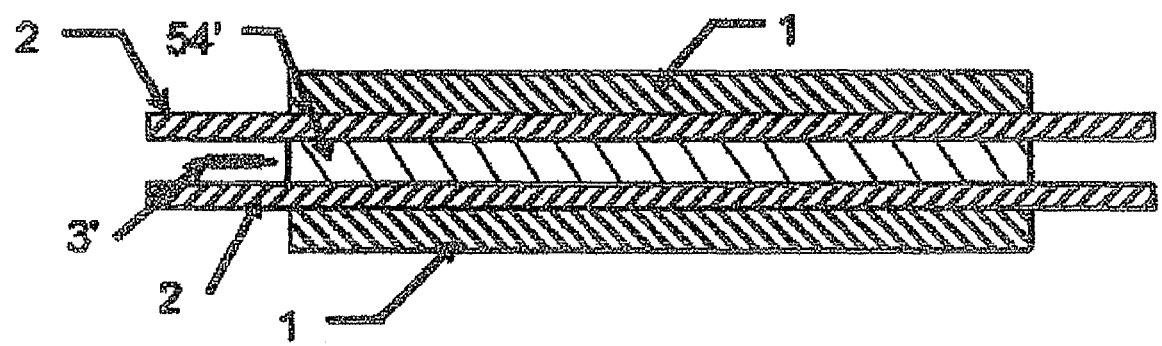
Figure 5C:
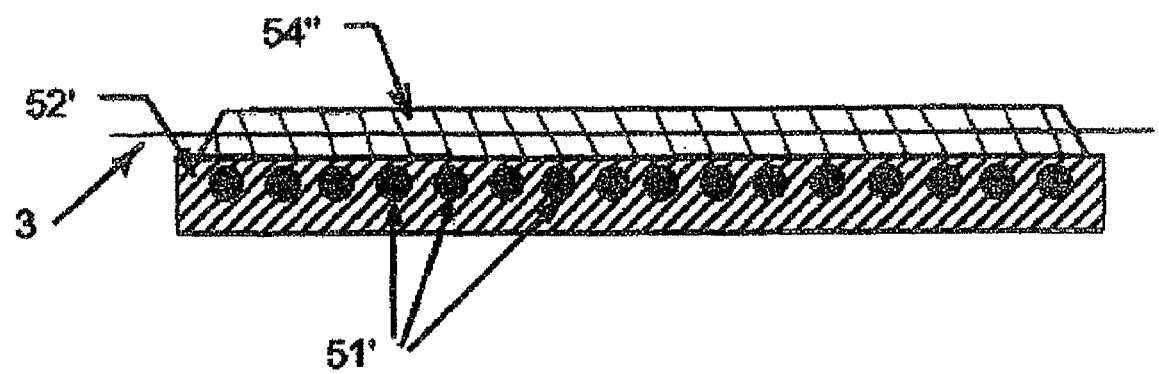

There are many possible ways of delivering the ROS from the plasma to the thermoplastic material. These designs can be categorized by either placing the fiber within or outside of the plasma discharge that is either volumetrically generated between two electrodes or a surface discharge such that the plasma is a thin volume of plasma above a surface of dielectric. Those skilled in the art will appreciate that the new process may alternatively be accomplished by placing the polymer in the vicinity immediately outside of the plasma volume as well as within the smaller volume of a surface discharge. The advantage of placement in close proximity but not within a plasma discharge is that the plasma could be operated at even higher energy levels that would otherwise create unacceptable amounts of detrimental etching of the fiber. These higher energy levels would allow for greater concentrations of ROS and promote more rapid oxidation of the fiber. The advantage of a surface discharge for fiber processing either within or immediately downstream of the surface plasma is that the plasma surface has higher electric field strengths, is easier to access, and is considerably simpler to maintain. FIGS. 5A-5C depict schematically several design variants. In each case, the figure shows a crossectional view of a substantially planar geometry.

FIG. 5A illustrates a fiber tow 3 passing between parallel electrodes 51 with dielectric layers 52. In this case, the fiber passes through the plasma 54, wherein it is directly exposed to reactive species. The plasma 54 is non-filamentary in nature.

FIG. 5B illustrates a similar electrode and dielectric configuration as shown in FIG. 5A; however, in this case the fiber consists of a flat coil of tow 3' disposed outside of the plasma 54'. Reactive species arising in the plasma 54' are converted out of the plasma and come into contact with the fiber 3'. Because the fiber is not directly immersed in the plasma 54', this plasma may be filamentary or non-filamentary in nature.

FIG. 5C illustrates another configuration, in which a series of parallel electrodes 51' are embedded in a planar dielectric 52' and create a surface plasma discharge 54". If the surface plasma is diffuse (non-filamentary), the fiber 3 may be immersed within the plasma as shown. Alternatively, if the plasma is filamentary the fiber may be displaced upward so that it lies outside of the plasma discharge but still close enough to become exposed to the reactive species originating within the plasma 54".

Example 4

Processing in Heated Gas Stream from a Remote Plasma Source

A plasma setup was constructed generally as shown in FIG. 5B. The samples were placed about 6 to 8 inches downstream of the edge of the plasma in an atmospheric plasma device. The device was operated at about 6 kHz and about 12 kV (rms). The exhaust gas temperature from the plasma device was about 80° C., which was further heated to selected temperatures from about 190 to about 210° C. prior to contacting the sample undergoing treatment. The gas was 75% $O_2$ and 25% $N_2$. Plasma processing of this gas composition would be expected to produce ozone, single delta oxygen, some monatomic oxygen and $NO_x$ active species. It would be further expected that the majority of the ozone may be decomposed by the heater, creating additional single delta oxygen, monoatomic oxygen and $NO_x$. PAN fibers were exposed to the heated gas stream for 30 min. The results of these experiments are summarized in Table 4 and further confirm that the inventive technique may be configured to create a remote plasma from which reactive species may be extracted and piped to a second location where the polymer is exposed, thereby providing another means of protecting the polymer from contact with overly energetic plasma. In this case, the gas was heated after extraction from the plasma, but it will be understood that in other situations it might be advantageous to cool the gases if a very energetic plasma source is used.

TABLE 4

Densities of PAN fibers after treatment in the exhaust of a remote plasma device using 75%$O_2$/25%N2

| Sample | Time, min | Inlet Gas Temp., ° C. | Density before plasma, g/cm$^3$ | Density after plasma, g/cm$^3$ |
|---|---|---|---|---|
| 1 | 30 | 190-195 | 1.235 | 1.28 |
| 2 | 30 | 200 | 1.235 | 1.31 |
| 3 | 30 | 210 | 1.235 | >1.40 |

Plasma processing can be used to fully stabilize and oxidize the fibers, or it can be combined with other oxidation stabilization pre- or post-processing techniques to achieve complete stabilization and oxidation. For example, the fibers could be partially stabilized and/or oxidized by thermal or other means, followed by plasma processing to rapidly finish the stabilization and oxidation. When combined with other processes, the plasma process can serve as the front or back-end of the stabilization/oxidation process, or it could even be an intermediate step that is both preceded and followed by other processing. If the plasma process is combined with another process it may be either discrete or continuous. Plasma processing combined with other processing means can be used to stabilize and/or oxidize or partially pre-oxidized PAN precursor or other precursors, however it is understood that the precursor chemistry is changed in the process such that it becomes chemically distinct from the virgin precursor after it has been partially stabilized or oxidized.

The foregoing examples focused on the use of PAN as the thermoplastic precursor material in order to clearly show the effects of process variables in carrying out the invention. Those skilled in the art will appreciate that the invention may be readily applied to other well-known fiber precursor materials. Some of these other materials include, but are not limited to 1) rayon fibers or cellulosic fibers (including natural or green fibers), lignin and lignin-base/blended precursors; 2) polyalkenes and polyolefins through PVC including exotic rigid rod polymers; 3) polyethylene, polypropylene, polybutadiene; 4) polyesters such as polyethylene terephthalates (PET); 5) polybutylene terephthalates (PBT); 6) pitch; 7) other low cost thermoplastic-based polymeric precursors including commodity grade, i.e., carpet grade and chemically modified carpet grade PAN and other chemically modified or pretreated thermoplastic precursors; 8) chemically modified precursors, such as chemically modified, or chemically compounded precursors; and 9) bio-engineered fibers (i.e. bio-manufactured spider-silk or similar filaments).

Example 5

Processing of Chemically Modified Precursors

U.S. Pat. No. 6,733,737 teaches a method for the processing of PAN/pitch and their composites. This method claims a significant reduction in the processing times of the oxidation step in the manufacturing of carbon fiber by the means of chemically modification (via blending or compounding or surface exposure) of the initial PAN material with an "oxygen spill over catalyst". This catalyst provides the required oxygen at the atomic level and thus provides for a chemically-based in-situ oxidation of the PAN precursor. These catalysts are in general either a lanthanum series oxide or a transition metal oxide. The method is based on generating part of the required oxygen directly inside or into the PAN/pitch material, thus minimizing or reducing in part the fiber's resistance to the diffusion of oxygen. Because oxygen is still required in part of this chemically modified precursor process, the plasma-assisted oxidation process would also provide needed oxygen required for the oxidative stabilization.

Because of the large quantity of oxygen required for oxidative stabilization a very large quantity of "spillover catalyst" will be needed; '737, for example, teaches that up to 50% additives (by weight) can be used. This high level of additives (>10%) will have a negative impact on the final mechanical properties of the resulting carbon materials. Furthermore, the addition of additives increases the cost of the precursor material due to both the blending or compounding cost and the high cost of the nano-scale rare-earth oxide additive itself. Nano-scale additives are required for proper extrusion of the precursor to form filaments. The examples within the patent are limited to carbon foams and carbon panels. Thus it will be appreciated that using the method of the present invention to materials of the type described in '737 could substantially reduce the required amount of additives and further accelerate the oxidation process. Such a combination process would potentially limit the detrimental impact of having a large quantity of the catalytic material on the mechanical properties of the final carbon product after all processing is completed.

Other chemically modified precursor materials are disclosed in U.S. Pat. Nos. 5,804,108 and 6,054,214 wherein a specific chemically modified (via blending or compounding) PAN material or paste converted into fiber precursor can undergo a more rapid oxidation step than what is known in conventional oxidation. These chemically modified PAN materials are able to undergo oxidation at higher temperatures (up to 400° C.). The higher temperature promotes more rapid oxidation by providing for a rapid molecular/intramolecular cross-linking across the bulk of the modified PAN material/fibers. The cross-linking provides for a more thermally structural stable material than the standard PAN precursor. Applicants' process nay be applied to formulations of the type described in '108 and '214 to further improve the kinetics of the oxidation required to stabilize the modified PAN precursors.

It will be understood that the invention is not limited specifically to fiber tows; other types of polymer that may be processed include single filaments, woven or knitted structures, felted structures, flat ribbons, sheets or films, and monolithic shapes. When the apparatus is configured for continuous processing, i.e., the treatment chamber has an inlet and an outlet opening, it will be understood that the polymer itself may be substantially continuous or alternatively the polymer may comprise a plurality of discrete components carried on a substantially continuous moving conveyor.

The processing of the fiber can be accomplished using either batch or continuous processing. Although continuous processing is a preferred mode for fiber precursors, batch processing may be more desirable for non-fibrous items such as sheets, films, and monolithic shapes. In either case, the plasma treatment may be accomplished with either single or multiple plasma devices. An array of plasma devices lends the production process robustness and allows for more intensive processing in the later portion of the production process. A single plasma device may be configured to generate plasmas of varying intensity either at different stages of processing of the item or to modify the thermal properties of the processing gas or the chemistry of the processing gas along the path of processing. Furthermore, it will be understood that the gas flow within the plasma device may be either parallel to, perpendicular with, or at some angle to the motion of the item undergoing processing.

As used herein, the term "means of support" can include supporting structures that may reside either inside or outside of the treatment chamber. For a batch-type process, the preferred support will be a generally flat surface upon which the polymer material may rest, the surface preferably being a dielectric material. For a continuous process, the preferred support comprises a feed reel and a take-up reel, both generally located outside of the treatment chamber. In this case the polymer is suspended between these reels and preferably held in a controlled state of tension preventing it from touching or dragging on the internal surfaces of the treatment chamber. As is well known in the art, the reels may further be disposed to spread a fiber tow from its naturally cylindrical shape into a generally flat or ribbon-like configuration for better management of heat and gas flow around the fibers. It will be understood that the entire process may be conducted with the polymer following a substantially horizontal path as shown in the examples or with the path oriented vertically if desired (for example, to reduce the amount of floor space occupied by the equipment). The system may further be configured to allow for the polymer to make more than one pass through the treatment chamber if desired. In another embodiment a continuous conveyor system may be provided to move a series of substantially identical discrete polymer objects through the treatment chamber.

Applicants do not regard the particular embodiment of the plasma configuration as critical except that processing of the polymer item within the plasma discharge must be accomplished within a non-filamentary plasma discharge. An alternate means of achieving this condition is to process the workpiece in either the after-glow or exhaust of a plasma device such that convection of the required oxidative chemistry is accomplished in a short enough time to allow the item to undergo the oxidation and stabilization. There are many plasma devices that one of ordinary skill in the art of plasma science may utilize to accomplish this process. It will be further appreciated that if the plasma is generated in a first location and the reactive oxidative species are transported from there to the treatment chamber, various incidental processes may be performed on the ROS, such as heating or cooling the gas stream to a desired temperature prior to its contacting the polymer. This incidental processing might in some cases change the chemical composition of the ROS or change the relative proportions of the various gaseous species. As one example of this embodiment of the invention, the plasma may be configured to create a large concentration of ozone, which may then be heated to decompose the ozone into atomic oxygen before introducing it into the treatment chamber. Thus, a conduit provided to carry the plasma-derived species into the processing chamber may contain such well known structures as heaters, heat exchangers, radiative cooling fins, and the like as are familiar in the art.

Those skilled in the art of plasma devices and processes will appreciate that control of the plasma device may involve any or all of the following parameters: voltage; frequency; current; power; and waveform density (pulsing or duty-cycle). The selection of a complete process for a particular fiber precursor and a particular application will involve the application of routine engineering analysis to select and optimize the following system parameters: plasma device and geometry; gas mixture and flow-rates; gas pressure; temperature; processing residence time; and composition of item undergoing processing.

It will be further understood that the description of exemplary processes using atmospheric pressure plasma processing should not be interpreted to limit the inventive process to precisely one atmosphere; on the contrary, the claimed process may be performed at any selected pressure, which might be less than one atmosphere or more than one atmosphere.

Although it is contemplated that the inventive process is intended primarily to prepare polymer fibers for further processing, typically carbonization, it will be understood that Applicants' stabilized fibers may be used without further processing, for example to make flame retardant fabrics.

We claim:

1. An apparatus for treating polymeric material comprising:
   a plasma generator comprising a microwave power source and an inlet for introducing an oxygen containing gas, wherein the oxygen containing gas is ionized by the microwave power source to provide a reactive oxidative species;
   a vacuum system comprising a pump;
   a treatment chamber for applying the reactive oxidative species to a surface of a polymeric material, wherein the treatment chamber comprises a first connection to the plasma generator for introduction of the reactive oxidative species, a second connection for communication with the vacuum system, an inlet and an exit; and
   a polymer material delivery system for traversing the polymeric material through the treatment chamber, the polymer material delivery system comprising a feed reel at said inlet of the treatment chamber and a take up reel at said exit of the treatment chamber.

2. The apparatus of claim 1 wherein said reactive oxidative species is generated at substantially atmospheric pressure.

3. The apparatus of claim 1 wherein said treatment chamber is maintained at a pressure substantially less than atmospheric pressure.

4. An apparatus for treating polymeric material comprising:
- a treatment chamber comprising at least two electrodes that produce a plasma containing a reactive oxidative species, wherein the at least two electrodes are separated and the treatment chamber includes an inlet and an exit to provide a passage way for a polymer fiber to be traversed therethrough, wherein a surface of the polymer fiber is exposed to the reactive oxidative species between the at least two electrodes; and
- a polymer fiber delivery system for traversing the polymer fiber through the passageway of the treatment chamber comprising a feed reel at the inlet of the treatment chamber and a take up reel at the exit of the treatment chamber.

5. The apparatus of claim 1 wherein said plasma generator comprises a microwave-transparent tube carrying an oxygen-containing gas, said microwave-transparent tube is at least partially disposed within a microwave applicator, and said microwave-transparent tube is further connected to said treatment chamber.

6. The apparatus of claim 1 wherein the temperature of the treatment chamber is from about 100° C. to about 400° C.

7. The apparatus of claim 6 wherein said polymeric material comprises polyacrylonitrile and said temperature is from about 120 to about 300° C.

8. The apparatus of claim 1 further comprising a pretreatment chamber wherein said polymeric material undergoes a selected treatment prior to exposure to said reactive oxidative species in said treatment chamber.

9. The apparatus of claim 8 wherein said treatment is selected from the group consisting of direct heating UV exposure, laser treatment, electron beam irradiation, and gamma irradiation.

10. The apparatus of claim 1 further comprising a tensioning means for maintaining a selected level of tension in that section of said polymeric material which is passing through said treatment chamber.

11. An apparatus for treating polymeric material comprising:
- a treatment chamber;
- at least two electrodes present in a first portion of the treatment chamber, wherein a plasma discharge is generated between the two electrodes;
- a source of oxygen-containing, gas to the treatment chamber, wherein a reactive oxidative species is created from the oxygen-containing gas by said plasma discharge between the two electrodes within the treatment chamber; and
- an exhaust extending from the at least two electrodes to a second portion of the treatment chamber, wherein said reactive oxidative species is transported to said polymeric material in the exhaust, said exhaust being separated from the plasma discharge that is between the at least two electrodes, and said polymeric material is stabilized and cross linked through exposure to said reactive oxidative species.

12. The apparatus of claim 4 further comprising an oxygen supply system in connection with the treatment chamber, wherein the connection between the treatment camber and oxygen supply system comprises a tube through which oxygen gas passes from said oxygen supply system to said oxygen supply system, and said tube comprises means for adjusting the temperature of said oxygen.

13. The apparatus of claim 12 wherein said reactive oxidative species comprises ozone that is converted by application of energy from said at least two electrodes to said oxygen gas, and said tube comprises means for heating said oxygen gas, wherein said oxygen gas is at least partially decomposed to ozone prior to entering said treatment chamber.

14. The apparatus of claim 12 wherein said plasma discharge is a thermal plasma and said tube includes means for cooling said reactive oxidative species before said reactive oxidative species enters said treatment chamber.

15. The apparatus of claim 4 wherein said treatment chamber has an inlet and an outlet opening and said polymeric material comprises a substantially continuous elongated structure to be drawn through said treatment chamber.

16. The apparatus of claim 4 wherein said plasma discharge is generated at substantially atmospheric pressure.

17. The apparatus of claim 4 wherein said at least two electrodes are configured to prevent filamentary plasma discharge and said polymeric material is immersed within said plasma.

18. An apparatus for treating polymeric material comprising:
- a treatment chamber comprising at least one electrode embedded in a dielectric material that produces a plasma containing a reactive oxidative species overlying a surface of the dielectric material; and
- a polymer fiber delivery system for traversing the polymer fiber through the plasma containing the reactive oxidative species.

* * * * *